(12) United States Patent
Chen et al.

(10) Patent No.: US 7,136,200 B2
(45) Date of Patent: Nov. 14, 2006

(54) METHOD FOR DETERMINING RESTORED SCANNING POSITION

(76) Inventors: Cheng-Kuei Chen, No. 124, His-Da Rd., Hsinchu (TW); Chu-Hui Yu, No. 10, 25 Lane, Sung-Ling Rd., Hsinchu (TW)

(*) Notice: Subject to any disclaimer, the term of this patent is extended or adjusted under 35 U.S.C. 154(b) by 858 days.

(21) Appl. No.: 10/064,907

(22) Filed: Aug. 28, 2002

(65) Prior Publication Data

US 2004/0042051 A1   Mar. 4, 2004

(51) Int. Cl.
H04N 1/04   (2006.01)
H04N 1/36   (2006.01)

(52) U.S. Cl. .............. 358/474; 358/412; 358/442; 358/486; 358/497; 358/404; 358/444; 358/450

(58) Field of Classification Search .......... 358/488, 358/486, 442, 468, 474, 412, 497, 496, 494, 358/473, 401, 444, 404, 505, 501, 450; 382/312, 382/313, 318, 319; 250/234–236, 211, 212
See application file for complete search history.

(56) References Cited

U.S. PATENT DOCUMENTS

| | | | | |
|---|---|---|---|---|
| 5,239,387 A * | 8/1993 | Stein et al. | ............. | 358/444 |
| 5,517,331 A * | 5/1996 | Murai et al. | ............. | 358/486 |
| 5,572,335 A * | 11/1996 | Stevens | ............. | 358/442 |
| 5,726,762 A * | 3/1998 | Akada et al. | ............. | 358/401 |
| 5,744,975 A * | 4/1998 | Notohardjono et al. | ..... | 324/760 |
| 5,801,839 A * | 9/1998 | Ochiai | ............. | 358/404 |
| 5,943,139 A * | 8/1999 | Tang et al. | ............. | 358/412 |
| 6,160,636 A * | 12/2000 | Nagano et al. | ............. | 358/412 |
| 6,262,816 B1 * | 7/2001 | Rindsig et al. | ............. | 358/498 |
| 6,335,807 B1 * | 1/2002 | Neale et al. | ............. | 358/486 |
| 6,388,777 B1 * | 5/2002 | Miyajima | ............. | 358/486 |
| 6,462,842 B1 * | 10/2002 | Hamilton | ............. | 358/486 |
| 6,603,579 B1 * | 8/2003 | Kuwahara | ............. | 358/468 |
| 6,615,115 B1 * | 9/2003 | Huang | ............. | 700/302 |
| 6,750,991 B1 * | 6/2004 | Cardot et al. | ............. | 358/497 |
| 6,870,566 B1 * | 3/2005 | Koide et al. | ............. | 348/296 |
| 6,972,876 B1 * | 12/2005 | Yokochi | ............. | 358/471 |
| 6,992,459 B1 * | 1/2006 | Kikuchi | ............. | 318/696 |

\* cited by examiner

*Primary Examiner*—Cheukfan Lee
(74) *Attorney, Agent, or Firm*—Berkeley Law & Technology Group LLC

(57) ABSTRACT

A method for position restoration. By comparing the graphic data and the restored graphic data, the graphic data closest to the restored graphic data is selected. Therefore, the graphic data scanned subsequently is correctly connected to the restored graphic data to avoid the missing line or repetition of graphic data.

18 Claims, 3 Drawing Sheets

METHOD FOR DETERMINING RESTORED SCANNING POSITION

BACKGROUND OF THE INVENTION

1. Field of the Invention

The invention relates in general to a method for determining restored position, and more particular, to a restoration method to avoid missing line and image repetition.

2. Related Art of the Invention

Due to advancing and fast-developing electronic techniques, the electronic industry has become one of the most important industries in modern society. Many high performance calculating systems are consequently being produced, and more and more electronic products are being used in daily life. In recent years, the growing processing speed and data storage capacity of the processor has greatly enhanced the performance of image processing, while the image processor such as the optical scanner or digital camera have become widely applied.

In the current operating process of the scanner, the graphic data generating speed is far faster than the data transmission speed between the scanner and the host, and therefore the graphic data scanned by the scanner requires a place for temporary storage. Such place for temporary storage is called a buffer, which ranges between about 32 Kbytes to about 512 Kbytes.

The faster the graphic data is generated; the more graphic data is stored in the buffer. When the buffer is full of the graphic data, the scanner has to stop scanning. If the scan continues under such circumstances, the graphic data will be lost, or operation problems may occur.

When the scanner head is performing scanning, the scanning process has to be stopped if the buffer is filled with the graphic data. Generally speaking, the stopped position is called the restored position. To allow each area of the document to have the same exposure time, the scanner head has a constant speed during scanning. Thus, the scanner head has to move backward with a certain distance. When the is completely emptied, the scanner head proceeds to the previously stopped position, that is, the restored position, to continue scanning. The scanning speed has to reach the previous scanning speed to result in a stable performance.

The procedure from filling the buffer with the graphic data, stopping scanning, the scanner head moving backward and restoring to the restored position and starting scanning is called smearing.

The smearing procedure is normally determined by the low transmission speed of interface connected to the host, such as the SCSI, USB and EPP. Alternatively, it also occurs when the computer host is too busy with other operation processes to read data from the interface. As a result, the graphic data is accumulated in the buffer until it is completely filled to cause smearing.

In the above smearing procedure, while returning to the restored position after moving backward, the scanner head may not return to the exact restored position due to the inertia effect or mechanic error of the scanner; therefore missing line and repetition of graphic data may occur.

SUMMARY OF THE INVENTION

The present invention provides a method for determining the restored position to avoid missing line and image repetition.

The method for determining the restored position provided by the present invention includes the following steps. In the first step, a scanner head moves along a first direction to scan a document. In the second step, the scanner head stops moving, and the position where the scanner head stops is defined as a restored position. Meanwhile, the data of the document located at the restored position is scanned by the scanner head, while the scanned data is defined as the restored graphic data. In the third step, the scanner head moves to a second direction opposing to the first direction with a first distance. In the fourth step, the scanner head moves along the first direction with a second distance to reach an initial scanning position, where the second distance is smaller than the first distance. In the fifth step, after moving along the second direction with the second distance, the scanner head proceeds in a stepping manner to scan a plurality of corresponding graphic data. In the sixth step, being compared to the restored graphic data, the scanned graphic data closest is selected and defined as the connecting graphic data. In the seventh step, the graphic data subsequent to the connecting graphic data is connected to the restored data.

According to one embodiment of the present invention, an additional step for erasing the scanned graphic data prior to the connecting graphic data is required, while the connecting graphic data can be used to replace the restored graphic data. In addition, while performing the third step, the first distance includes 36 steps. That is, the scanner head moves 36 steps along the second direction. While performing the fourth step, the scanner head moves 34 steps along the first direction.

In one embodiment of the present invention, the restored graphic data comprises a plurality of standard pixels, and each scanned graphic data comprises a plurality of pixels. While performing the sixth step, a part of the standard pixels is used as the comparison reference to compare with a part of the pixels of each graphic data in the corresponding positions. Alternatively, while performing the sixth step, all the standard pixels can be used as the comparison reference to compare to the pixels of each of the graphic data in the corresponding position.

Accordingly, the present invention compares the scanned graphic data with the restored graphic data to select the graphic data closest to the restored graphic data. The selected graphic data scanned subsequently can thus be connected with the restored graphic data correctly.

BRIEF DESCRIPTION OF THE DRAWINGS

These, as well as other features of the present invention, will become more apparent upon reference to the drawings wherein.

DETAILED DESCRIPTION

Figure 1:
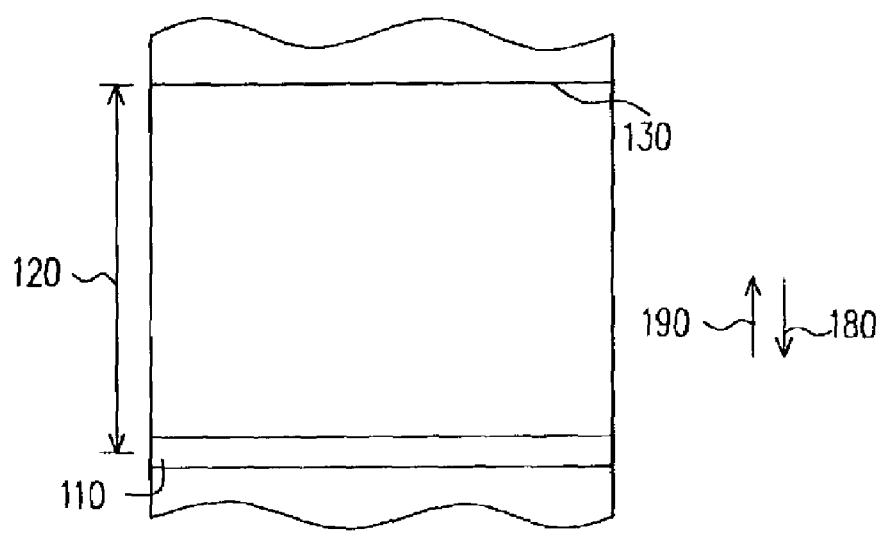
FIGS. 1 and 2 are process flows showing the method for determining restored position according to the present invention.
Figure 2:
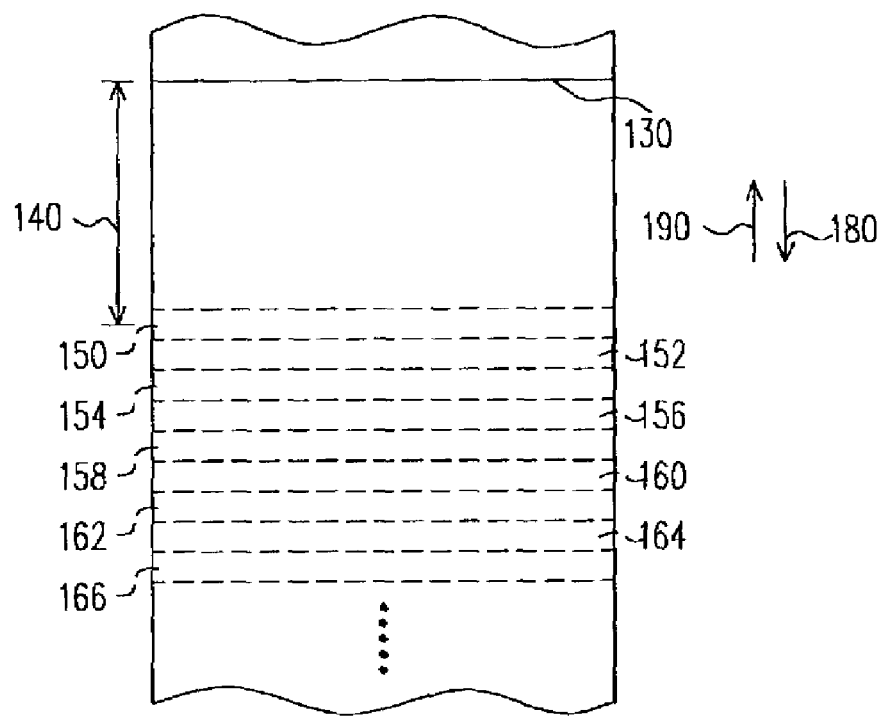

Referring to FIGS. 1 and 2, schematic diagrams illustrating a method to determine restored position in one preferred embodiment of the present invention are shown. In FIG. 1, when the scanner (not shown) is scanning, the scanner head moves along a first direction 180, where the movement of the scanner head is in a stepping manner. The scanned graphic data Is then stored in the buffer (not shown) of the scanner. When the buffer has insufficient capacity, the scanner head stops moving. The position where the scanner head stops is defined as the restored position 110. The data of the document scanned by the scanner head at the restored position 110 is defined as the restored graphic data.

The scanner head then moves with a first distance along a second direction to reach an initial position 130. For example, in a stepping manner, the scanner head moves 36 steps to reach the initial position 130. The second direction 190 is an opposite direction to the first direction 180 in this embodiment.

Referring to FIG. 2, after the scanner head reaches the initial position 130, the scanner head moves along the first direction 180 with a second distance 140 to reach an initial scanning position 150. The second distance 140 is smaller than the first distance 120. The scanner head obtains a graphic data by scanning at the initial scanning position 150, and such graphic data is defined as the initial graphic data. It is appreciated that before reaching the initial scanning position 150, sufficient capacity of the buffer of the scanner is required to store the subsequent scanned graphic data. For the relationship between the remaining capacity of the buffer and the movement of the scanner head refer to the Taiwanese Patent No. 432861; whereby the scanning speed can be increased.

After the scanner head moves with the second distance 140 along the first direction 180, the scanner head continues moving along the first direction 180 and scans the document 110 until he buffer is again short of capacity. The scanner head proceeds in a stepping manner. A graphic data is scanned for each step that the scanner head steps forward. In one embodiment, the scanner head steps many steps to various positions such as the first to eighth positions 152, 154, 156, 158, 160, 162, 164 and 166. Corresponding to the first to eighth positions 152 to 166, first to eighth graphic data are scanned, respectively.

After the scanner head starts scanning, a comparison step is performed. That is, the scanned graphic data such as the first to the eighth graphic data are compared to the restored graphic data, respectively, among which the one closest to the restored graphic data, for example, the second graphic data, is selected as the connecting graphic data.

After realizing that the second graphic data is the one closest to the restored graphic data, the third graphic data is connected to the restored graphic data. The initial graphic data, the first graphic data and the second graphic data are removed. Therefore, the subsequently scanned graphic data can be correctly connected to the previously scanned graphic data without the problems of missing line and image repetition. Alternatively, the restored graphic data can also be replaced by the second graphic data.

Figure 3:
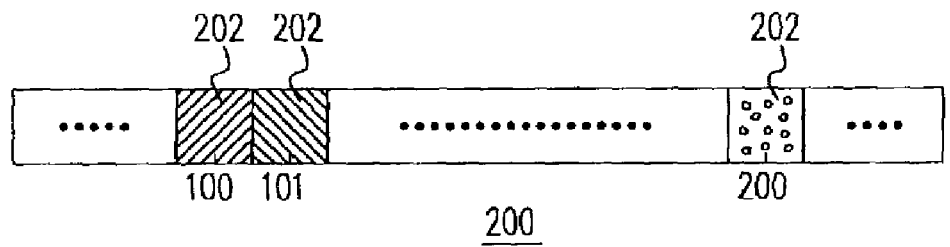
FIG. 3 is a schematic drawing showing the arrangement of the standard pixels of the restored graphic data in one embodiment of the present invention.
Figure 4:
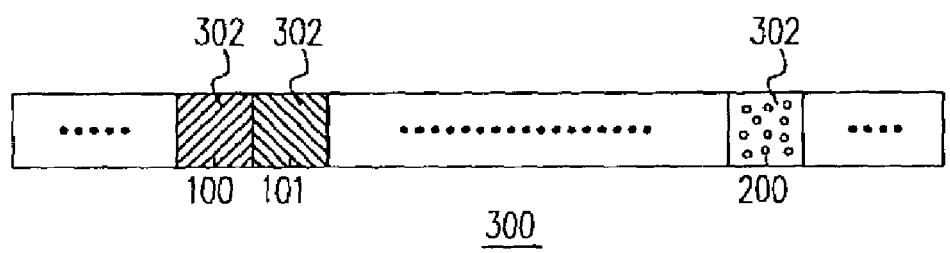
FIG. 4 is a schematic drawing showing the arrangement of the pixels of the graphic data.

Referring to FIGS. 3 and 4, FIG. 3 schematically shows arrangement of the standard pixels of the restored graphic data, and FIG. 4 schematically shows arrangement of the pixels of the scanned graphic data. As shown in FIG. 3, the restored graphic data 200 comprises a plurality of standard pixels 202, while in FIG. 4, each of the scanned graphic data 300 comprises a plurality of pixels 302. During the comparison procedure, a part of the standard pixels 202 can be used as the comparison reference to respectively compare a part of the pixels 302 for each of the graphic data 300. The part of the pixels to be compared includes parts of the pixels of the initial graphic data, the first to the fourth graphic data, while the pixels 302 to be compared to the standards pixels 202 are in the positions corresponding to those of the standard pixels 302, respectively. For example, the one hundredth to two hundredth pixels 302 are compared to the one hundredth to the two hundredth standard pixels 202. Alternatively, all of the standard pixels 202 can also be used as the comparison reference to respectively compare each of the pixels 302 of each graphic data. Again, the pixels 302 are compared to the standard pixels 202 in the corresponding positions.

Figure 5:
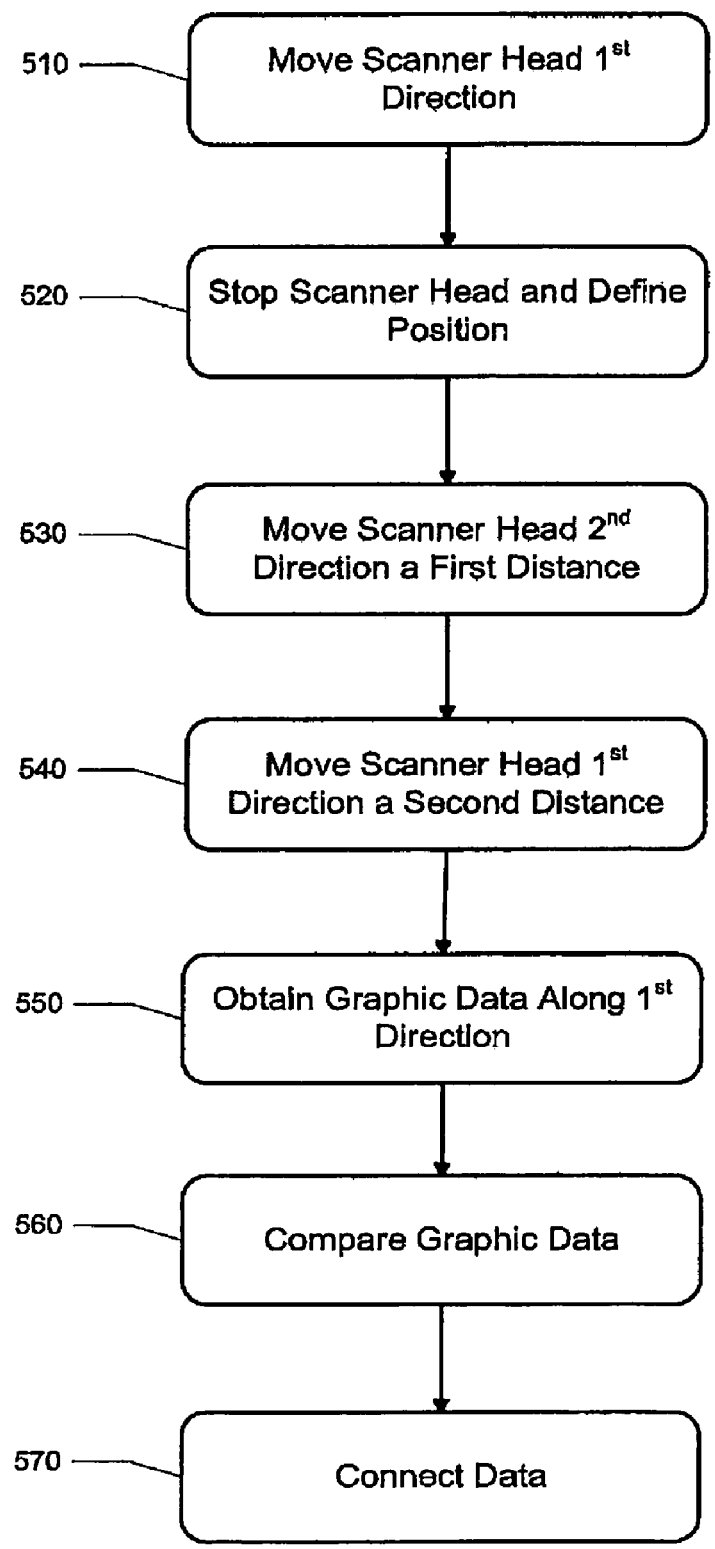
FIG. 5 is a flow diagram illustrating a method to determine a restored scanning position.

Referring to FIG. 5, a flow chart 500 of a method to determine a restored scanning position is shown. In flow chart 500, at block 510, a scanner head may be moved along a first direction along a document to be scanned. In one embodiment, the head may be moved in a stepping manner, and data may be obtained from the document along the first direction. At block 520, the scanner head may be stopped, a position of the scanner head may be defined as a restored position, and at least a portion of data scanned along the first direction may be defined as restored graphic data. At block 530, the scanner head may be moved in a second direction for a first distance, and may be moved to a first position, for example. The second direction may be an opposite direction of the first direction, for example. At block 540, the scanner head may be moved a first direction a second distance. The scanner head may be moved the first direction a second distance to a second position, for example, and may obtain scanned data at the second position. The scanned data at the second position may be defined as initial graphic data. At block 550, graphic data may be obtained along the first direction. At block 560, when the graphic data is obtained, the obtained graphic data may be compared with the restored graphic data, such as to determine whether a portion of the graphic data correlates with the restored graphic data obtained at block 520. At block 570, the graphic data which correlates with the restored graphic data may be connected with the restored graphic data, such as to form contiguous data.

According to the above, the present invention selects a closest graphic data of a restored graphic data by comparing the scanned graphic data with the restored graphic data, such that the subsequently scanned graphic data can be correctly connected to avoid the missing line and data repetition.

Other embodiments of the invention will appear to those skilled in the art from consideration of the specification and practice of the invention disclosed herein. It is intended that the specification and examples are to be considered as exemplary only, with a true scope and spirit of the invention being indicated by the following claims.

The invention claimed is:

1. A method, comprising:

moving a scanner head along a first direction to scan a document;

stopping the scanner head and defining a position where the scanner head stops as a restored position, and defining a portion of data of the document scanned at the restored position as a restored graphic data;

moving the scanner head along a second direction with a first distance, wherein the second direction is opposite to the first direction;

moving the scanner head along the first direction with a second distance, wherein the second distance is smaller than the first distance;

moving the scanner head along the first direction in a stepping manner to scan the document, so as to obtain graphic data;

comparing the graphic data with the restored graphic data to select a graphic data closest to the restored graphic data defining connecting graphic data; and connecting the connecting graphic data with graphic data scanned thereafter and with the restored graphic data.

2. The method according to claim 1, and further comprising removing the graphic data scanned before the connecting graphic data after connecting the graphic data.

3. The method according to claim 1, wherein connecting the graphic data further comprises replacing the restored graphic data with the connecting graphic data.

4. The method according to claim 1, wherein the restored graphic data comprises a first plurality of pixels, and the graphic data comprises a second plurality of pixels, and wherein comparing the graphic data with the restored graphic data comprises comparing a portion of the second plurality of pixels to a portion of the first plurality of pixels.

5. The method according to claim 1, wherein the restored graphic data comprises a first plurality of pixels, and the graphic data comprises a second plurality of pixels, and wherein comparing the graphic data with the restored graphic data comprises comparing at least some of the second plurality of pixels to the first plurality of pixels.

6. The method according to claim 1, wherein comparing the graphic data comprises comparing a portion of the graphic data first scanned to the restored graphic data.

7. An apparatus, comprising:

means for moving a scanner head along a first direction to scan a document;

means for stopping the scanner head and means for defining a position where the scanner head stops as a restored position, and defining a portion of data of the document scanned at the restored position as a restored graphic data;

means for moving the scanner head along a second direction with a first distance, wherein the second direction is opposite to the first direction;

means for moving the scanner head along the first direction with a second distance, wherein the second distance is shorter than the first distance;

means for moving the scanner head along the first direction to scan the document, so as to obtain graphic data;

means for comparing the graphic data with the restored graphic data to select a graphic data closest to the restored graphic data and defining as a connecting graphic data; and means for connecting the connecting graphic data with graphic data scanned thereafter and with the restored graphic data.

8. The apparatus of claim 7, further comprising means for removing the graphic data scanned before the connecting graphic data after connecting the graphic data.

9. The apparatus of claim 7, wherein the means for connecting the graphic data further comprises means for replacing the restored graphic data with the connecting graphic data.

10. The apparatus of claim 7, wherein the restored graphic data comprises a first plurality of pixels, and the graphic data comprises a second plurality of pixels, and wherein the means for comparing the graphic data with the restored graphic data comprises means for comparing a portion of the second plurality of pixels to a portion of the first plurality of pixels.

11. The apparatus of claim 7, wherein the restored graphic data comprises a first plurality of pixels, and the graphic data comprises a second plurality of pixels, and wherein the means for comparing the graphic data with the restored graphic data comprises means for comparing at least some of the second plurality of pixels to the first plurality of pixels.

12. The apparatus of claim 7, wherein the means for comparing the graphic data comprises means for comparing a portion of the graphic data first scanned to the restored graphic data.

13. An article comprising: a storage medium having stored thereon instructions that, if executed, results in determining a restored scanning position by:

moving a scanner head along a first direction to scan a document;

stopping the scanner head and defining a position where the scanner head stops as a restored position, and defining a portion of data of the document scanned at the restored position as a restored graphic data;

moving the scanner head along a second direction with a first distance, wherein the second direction is opposite to the first direction;

moving the scanner head along the first direction with a second distance, wherein the second distance is smaller than the first distance;

moving the scanner head along the first direction in a stepping manner to scan the document, so as to obtain graphic data;

comparing the graphic data with the restored graphic data to select a graphic data closest to the restored graphic data and defining as a connecting graphic data; and connecting the connecting graphic data with graphic data scanned thereafter and with the restored graphic data.

14. The article of claim 13, wherein said storage medium further includes instructions that, if executed, further result in the .graphic data scanned before the connecting graphic data being-removed after connecting the graphic data.

15. The article of claim 13, wherein said storage medium further includes instructions that, if executed, further result in connecting the graphic data by replacing the restored graphic data with the connecting graphic data.

16. The article of claim 13, wherein the restored graphic data comprises a first plurality of pixels, and the graphic data comprises a second plurality of pixels, and wherein comparing the graphic data with the restored graphic data comprises means for comparing a portion of the second plurality of pixels to a portion of the first plurality of pixels.

17. The article of claim 13, wherein the restored graphic data comprises a first plurality of pixels, and the graphic data comprises a second plurality of pixels, and wherein comparing the graphic data with the restored graphic data comprises means for comparing at least some of the second plurality of pixels to the first plurality of pixels.

18. The article of claim 13, wherein said storage medium further includes instructions that, if executed, further result in comparing the graphic data by comparing a portion of the graphic data first scanned to the restored graphic data.

* * * * *